(12) United States Patent
Lalonde

(10) Patent No.: US 7,414,386 B2
(45) Date of Patent: Aug. 19, 2008

(54) METHODS FOR TESTING OPTICAL TRANSMITTER COMPONENTS

(75) Inventor: André Lalonde, Allen, TX (US)

(73) Assignee: Finisar Corporation, Sunnyvale, CA (US)

( * ) Notice: Subject to any disclaimer, the term of this patent is extended or adjusted under 35 U.S.C. 154(b) by 145 days.

(21) Appl. No.: 11/426,297

(22) Filed: Jun. 23, 2006

(65) Prior Publication Data

US 2006/0233546 A1    Oct. 19, 2006

Related U.S. Application Data

(62) Division of application No. 11/103,766, filed on Apr. 12, 2005, now Pat. No. 7,129,689.

(60) Provisional application No. 60/599,259, filed on Aug. 4, 2004.

(51) Int. Cl.
    *G01R 19/00* (2006.01)
(52) U.S. Cl. ............ 324/76.11; 324/767; 250/214 R; 356/4.06; 398/9

(58) Field of Classification Search ............ 356/4.06; 324/76.11, 767; 250/214 R; 398/9
See application file for complete search history.

(56) References Cited

U.S. PATENT DOCUMENTS

| 4,990,895 A | * | 2/1991 | Juds ........................... 340/635 |
| 5,214,593 A | * | 5/1993 | Magnussen, Jr. et al. ...... 702/32 |
| 5,365,055 A | * | 11/1994 | Decker et al. ........... 250/214 R |

OTHER PUBLICATIONS

Analog Devices, "LF to 2.5 GHz TruPwr Detector," 2001, no month available.

\* cited by examiner

*Primary Examiner*—Vincent Q Nguyen
(74) *Attorney, Agent, or Firm*—Workman Nydegger

(57) ABSTRACT

Methods for testing optical components, such as laser diodes or light emitting diodes, that are manufactured for use in optical transmitters or transceivers. The testing methods are performed using a true RMS conversion circuit in a test apparatus. The testing methods are performed by receiving an optical signal with AC and DC components from the optical component that is to be tested. The optical signal is converted to an electrical signal, and the AC and DC components of the electrical signal are separated. An RMS circuit of the test apparatus converts the AC component of the electrical signal to a DC function of the RMS value of the AC component of the electrical signal. This testing method can be used to determine whether optical components are suitable for use by customers or in products.

15 Claims, 2 Drawing Sheets

METHODS FOR TESTING OPTICAL TRANSMITTER COMPONENTS

CROSS-REFERENCE TO RELATED APPLICATIONS

This application is a divisional of U.S. patent application Ser. No. 11/103,766, filed Apr. 12, 2005, now U.S. Pat. No. 7,129,689, which claims the benefit of U.S. Provisional Application Ser. No. 60/599,259, filed Aug. 4, 2004. The foregoing patent applications are incorporated herein by reference.

BACKGROUND OF THE INVENTION

1. The Field of the Invention

The invention generally relates to fiber-optic test equipment. More specifically, the invention relates to test equipment for testing optical transmitters and receivers used in fiber-optic communications.

2. Description of the Related Art

Fiber-optic networking can be used to communicate in modern high-speed networks. To transmit data on a fiber-optic network, the data must be converted from an electronic signal to an optical signal. This conversion may be done, for example, by using a transmitter or transmitting optical subassembly (TOSA). The transmitters and TOSAs often include light generating devices such as a laser or light emitting diode (LED). The light generating device is modulated according to digital data to produce a modulated optical signal.

When optical signals are received, those optical signals must generally be converted to an electronic signal. This is often accomplished using a receiver or a receiver optical subassembly (ROSA). Receivers and ROSAs generally include a photo sensitive device such as a photodiode connected to a transimpedance amplifier (TIA). When an optical signal impinges the photo sensitive device, a modulated current is induced in the photo sensitive device. This current can be converted by the TIA to an electronic signal usable by digital devices on a network.

Manufacturers of ROSAs and TOSAs typically perform various performance testing on the ROSAs and TOSAs before they are delivered to distributors and end customers. This performance testing can be used to detect defects or to sort components into groups of different rated values.

More particularly, testing directed towards the ROSA may include testing the responsivity of the ROSA to a modulated optical signal, testing the amount of current produced for a given amount of optical signal and so forth. Testing responsivity includes comparing a modulated optical signal input into the ROSA to an AC electrical signal produced by the ROSA as a result of receiving the AC optical signal.

Testing may be performed on the TOSA to characterize operating characteristics of the TOSA. One test that may be performed includes plotting the amount of optical energy produced by the TOSA as a function of the amount of current used to drive the TOSA. Another test includes measuring the amount of noise produced by the TOSA.

Many of these tests have conventionally been performed using expensive high-frequency test equipment. For example, some tests use a high frequency communications analyzer costing in the tens of thousands of dollars. Further, many of these test devices are general-purpose test devices. As such, these devices require excessive amounts of human interaction to perform the test result in and increase test times for each component. When each and every component manufactured is tested, this requires an inordinate amount of manpower and equipment to process testing of the components quickly.

Additionally, testing is often not repeatable from part to part. This is due to the changing nature of cables and the like associated with general purpose test equipment.

BRIEF SUMMARY OF THE INVENTION

An embodiment of the invention includes a method of testing optical components. The method includes receiving an optical signal from an optical source. The optical signal including AC and DC components. The optical signal is converted to an electrical signal. The AC and DC components of the electrical signal are separated. The AC component of the electrical signal is converted to a function of the RMS value of the AC component of the electrical signal. The function of the RMS value is provided to a data acquisition system.

The testing methods allow for AC and DC testing to be completed on optical components using a single inexpensive test board. This can conserve resources as only a single test fixture is used to perform both sets of tests.

These and other advantages and features of the present invention will become more fully apparent from the following description and appended claims, or may be learned by the practice of the invention as set forth hereinafter

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
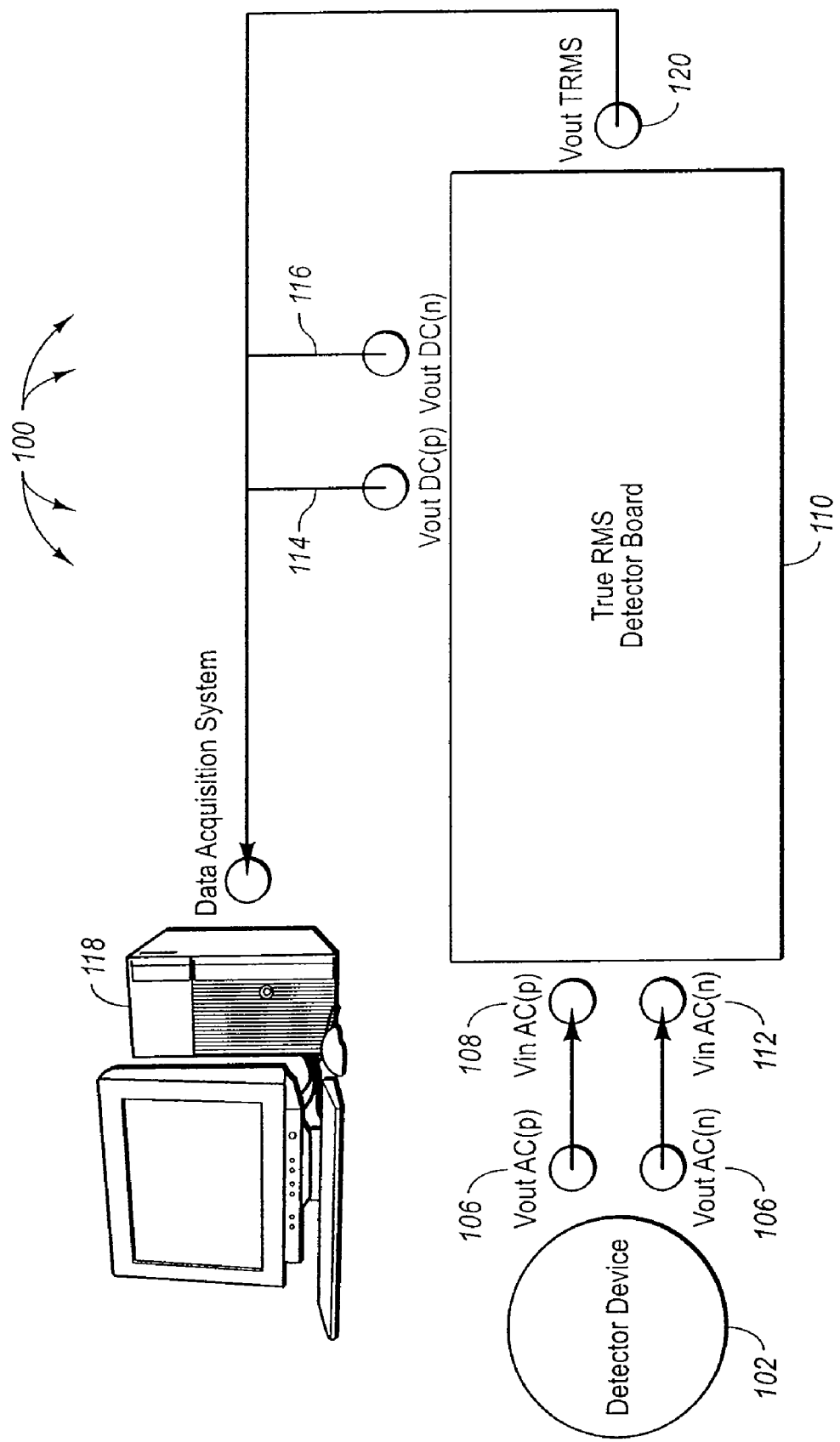
FIG. 1 illustrates a block diagram overview of a test apparatus for testing optical components.

Referring now to FIG. 1, an embodiment of the invention is illustrated as a test apparatus 100 that provides for monitoring of AC and DC signals produced by a transmitter. The apparatus 100 shown in FIG. 1 may be used to test transmitter devices. In one example, the transmitter device may be a TOSA or a transmitter which includes a laser diode or light emitting diode (LED). The apparatus shown in FIG. 1 includes a detector device 102. The detector device 102 may be for example a detector that includes a photodiode coupled to a transimpedance amplifier with a differential output. The detector device 102 will be discussed in more detail with reference to FIG. 2 described herein. The detector device 102 outputs a positive output signal at a positive output signal terminal 104 and a negative output signal at a negative output terminal 106. The positive output signal is fed into a positive input port 108 of an RMS detector board 110. Similarly the negative output signal is input to a negative input port 112 of the RMS detector board 110.

The RMS detector board 110 includes circuitry for filtering DC components of the output signals from the AC components. The DC components of the signal are output at detector board DC output ports 114, 116. The DC output signals may be received by a data acquisition system 118 for use in characterizing the properties of a transmitter.

The AC portions of the signals are converted to a function of the RMS value of the AC signals which is then fed to a RMS output port 120. The function of the RMS value of the AC signal may be received by the data acquisition system 118 and used in characterizing various characteristics of the transmitter.

An alternate embodiment of the invention may be used to test receiver devices by using a transmitter fixed as a portion of the test apparatus 100. In this example, the detector device 102 may be removable such that testing can be performed on numerous detector devices or receivers produced by a manufacturer.

Figure 2:
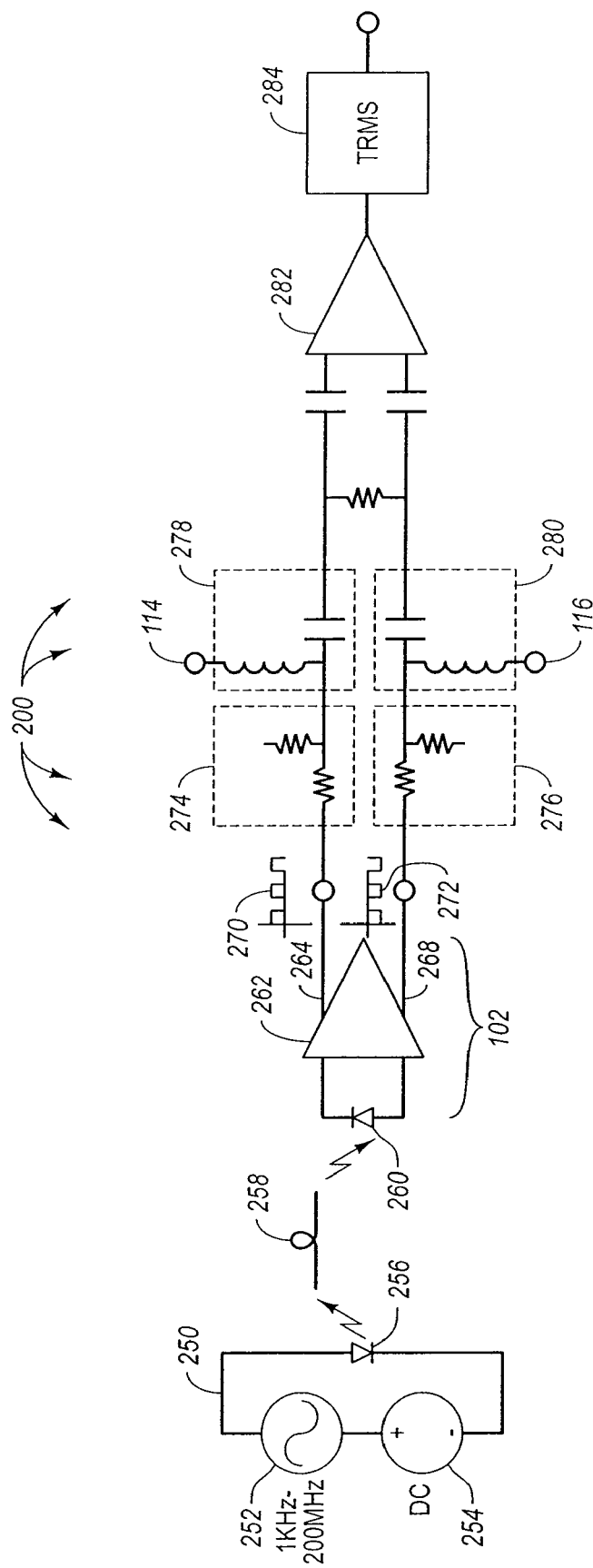
FIG. 2 illustrates a schematic drawing showing the general construction of a test apparatus for optical components.

Referring now to FIG. 2, a circuit diagram illustrates various features of one embodiment. FIG. 2 illustrates a transmitter source 250. The transmitter source includes an AC supply 252 and a DC supply 254. The DC supply 254 may be used to bias a LED or laser diode 256.

The AC supply 252 may be used to modulate the LED or laser diode 256 with data or for other reasons. In one embodiment, the AC supply 252 is configured to operate at between 1 KHz and 200 MHz. Other embodiments of the invention may allow for frequencies up to 2.5 GHz and beyond.

When the test apparatus 200 shown in FIG. 2 is used for testing laser diodes and LEDs, the transmitter source may be configured to couple to a transmitter such as an LED or laser diode. This configuration may include an appropriate test fixture that allows for quick removal and replacement of transmitters in the test fixture. The LED or laser diode 256 may be optically coupled to a receiver 102. The optical coupling shown in FIG. 2 includes a path through a patch cord 258. This allows the optical signal produced by the LED or laser diode 256 to be transmitted to the receiver 102.

The receiver 102 includes a photodiode 260 and a transimpedance amplifier 262. The photodiode 260 converts optical signals received from the patch cord 258 to a small electrical current through the photodiode 260. The transimpedance amplifier 262 converts the small current through the photodiode 260 into a higher power differential electrical signal that is output as a differential signal on a positive output 264 and a negative output 268. The differential signal includes a positive differential signal 270 and a negative differential signal 272. The positive differential signal is fed to a first impedance matching network 274. The negative differential signal is sent to a second impedance matching network 276.

The first and second impedance matching networks 274, 276 may be configured to match the line characteristics from the output of the transimpedance amplifier 262. In one embodiment, the impedance matching networks 274, 276 are fabricated on a printed circuit board that includes various paths for receiving different values of components such as capacitors, resistors and inductors. Thus a printed circuit board can be customized for a particular test by stuffing the board with appropriately chosen components. Embodiments of the invention contemplate the use of several different kinds of matching networks. For example and not by way of limitation, a matching network may include specially designed printed circuit board traces that have a particular capacitance, inductance and/or resistance. The matching networks may include fixed components such that the matching networks are fixed for a particular application or use. The matching networks may include switched components such that the matching network may be used for a plurality of different applications with minimal reconfiguration. The matching networks may comprise a variable filter for even further flexibility in designing tests apparatus. In one example the matching networks may include a digital signal processor (DSP) that functions as a filter. In some embodiments the first and second impedance matching networks 274, 276 are designed with similar or complementary printed circuit board layouts and components. This helps to ensure that the positive differential signal 270 and the negative differential signal 272 remain in phase with respect to each other.

The positive differential signal passes through the first impedance matching network 274 to a first filter 278. The first filter 278 separates AC and DC signals from the positive differential signal 270. The DC portions of the positive differential signal 270 are fed to a DC output 114. The negative differential signal 272 follows a similar path through the second impedance matching network 276 to a second filter 280 where the DC portion of the negative differential signal 272 is output at a DC output 116. The first and second filters 278, 280 may be in one example bias tees.

The AC output from the first and second filters 278, 280 is fed into an amplifier 282. The amplifier 282 in one embodiment is a high frequency amplifier with a wide bandwidth, low noise and other desirable characteristics. One example of an amplifier that may be used is the AD8129 available from Analog Devices. This particular amplifier functions at frequencies up to 250 MHz. The amplifier 282 is the differential amplifier that compares the positive AC signal and the negative AC signal and produces a difference of the two AC signals. This difference of the two AC signal is fed to a true RMS converter 284.

The true RMS converter 284 converts the difference of the AC signals to a function of the RMS value of the difference of the AC signals. In one embodiment the true RMS converter 284 maybe part number AD8361 from analog devices. This particular true RMS converter outputs a signal that is generally 7.5 times the value of the RMS value of the difference of the AC signals. The function of the RMS value of the difference of the AC signals may vary slightly from the 7.5 value depending on the configuration of the true RMS converter 284. Alternate functions maybe readily obtained from the data sheet for this device which is available from analog devices on their website. As mentioned previously, the present embodiment shown is designed for operation between 1 KHz and 200 MHz. However, other embodiments may be designed to function up to 2.5 gigahertz and beyond. When embodiments are designed for frequencies above 200 MHz, typically the embodiments will be designed as a band pass filter for a range of frequencies so as to obtain the best results from of the true RMS converter 284. For example, it may be desirable to bias the true RMS converter 284 such that lower frequencies are less usable when the circuit is designed for higher frequencies. When constructing circuits for use above 200 MHz, an alternate amplifier 282 may be used that has a bandwidth suitable for use above 200 MHz.

In constructing the test apparatus 200 it is desirable to construct the apparatus using a printed circuit board layout for certain portions of the circuits. It may also be desirable to ensure that traces on the printed circuit board are matched for positive and negative signal paths. If the traces are not matched for positive and negative signal paths, positive and negative signals may vary slightly in their phase from each other resulting an erroneous readings from the RMS converter 284.

The apparatuses described herein should be calibrated when used as test equipment. However, using the components described herein as test apparatuses has been shown to be very accurate. Thus an automated calibration may be used where calibration equipment used in the automated calibration is calibrated so as to verify the accuracy of the automated calibration. In one embodiment, a buffer circuit connected to the output of the true RMS converter 284 may be used to compensate for a circuit that is out of calibration. The buffer circuit may be an amplifier circuit this about unity (i.e. a gain of 1), but adjustable slightly up or down to compensate for any inaccuracies.

The terms high and low frequency, as described herein should be considered relative terms rather than applying to a specific standard of frequencies. Thus high-frequency as used herein is used to describe communications that use relatively high modulation rates as opposed to a specific range of frequencies as is used in some areas of the electronic and communication arts.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method of testing an optical component, comprising:
   receiving an optical signal from an optical component, the optical signal including AC and DC components;
   converting the optical signal to an electrical signal;
   separating AC and DC components of the electrical signal, wherein separating the AC and DC components of the electrical signal comprises:
      using a first matching network of the test apparatus, receiving a high output of a differential output of an amplifier associated with the optical receiver of the test apparatus;
      using a second matching network of the test apparatus, receiving a low output of the differential output of the amplifier; and
      using a first filter associated with the first matching network and a second filter associated with the second matching network to separate the AC component and the DC component;
   converting the AC component of the electrical signal to a function of the RMS value of the AC component of the electrical signal; and
   providing the function of the RMS value to a data acquisition system.

2. The method of claim 1, further comprising performing calibration by comparing the function of the RMS value to a calibrated RMS value of the AC portion of the electrical signal.

3. The method of claim 2, further comprising compensating for a difference that shows a miscalibration between the function of the RMS value and the calibrated RMS value of the AC portion of the electrical signal.

4. The method of claim 1, wherein converting the AC component of the electrical signal to a function of the RMS value of the AC component of the electrical signal comprises converting the AC component to a DC function of the RMS value.

5. The method of claim 4, wherein converting the AC component to a DC function of the RMS value is performed using an RiVIS conversion circuit of a test apparatus.

6. The method of claim 1, wherein the optical component comprises one of a laser diode and a light emitting diode.

7. The method of claim 6, wherein receiving the optical signal is performed using an optical receiver of a test apparatus.

8. The method of claim 7, further comprising controlling the optical component using a transmitter source that is connected to the optical component and provides an AC supply and a DC supply to the optical component during testing.

9. The method of claim 8, wherein converting the optical signal to an electrical signal comprises receiving the optical signal using an optical receiver of the test apparatus.

10. The method of claim 6, further comprising determining, as a result of testing the optical component, determining whether the optical component is defective.

11. The method of claim 6, further comprising, as a result of testing the optical component, sorting the optical component into one of a plurality of groups of different-rated values.

12. The method of claim 6, further comprising determining, as a result of testing the optical component, whether the optical component is to be included in an optical transceiver.

13. The method of claim 1, further comprising, as a result of testing the optical component, plotting the amount of optical energy produced by the optical component as a function of the amount of current used to drive the optical component.

14. The method of claim 1, further comprising, as a result of testing the optical component, determining the amount of noise produced by the optical component.

15. The method of claim 1, wherein the method is performed on a single test board.

* * * * *

UNITED STATES PATENT AND TRADEMARK OFFICE
CERTIFICATE OF CORRECTION

PATENT NO. : 7,414,386 B2  
APPLICATION NO. : 11/426297  
DATED : August 19, 2008  
INVENTOR(S) : Lalonde Page 1 of 2

It is certified that error appears in the above-identified patent and that said Letters Patent is hereby corrected as shown below:

Drawings  
Sheet 1, please replace the current drawing of FIG. 1 with the drawing depicted below wherein the "positive output signal terminal" is properly labeled --104--

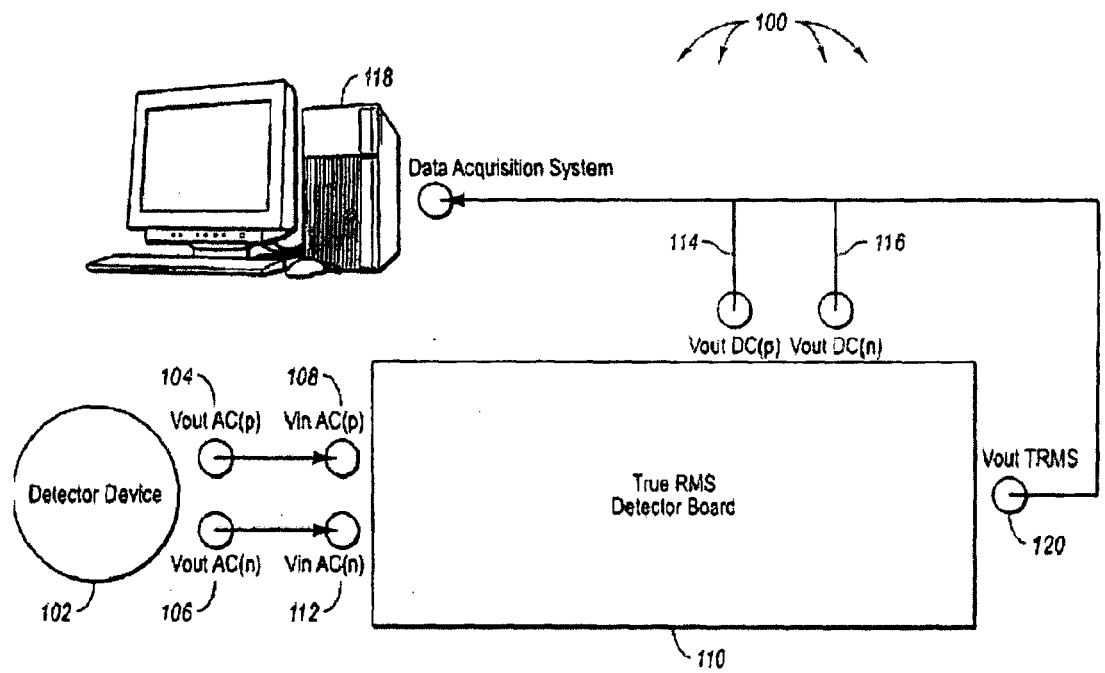

Fig. 1

Column 2  
Line 43, remove "; and" and add --.--

Signed and Sealed this

Twenty-third Day of November, 2010

David J. Kappos  
*Director of the United States Patent and Trademark Office*

Column 4
Line 1, change "tests apparatus" to --a test apparatus--
Line 28, change "signal" to --signals--
Lines 33 and 39, change "maybe" to --may be--
Lines 33 and 40, change "analog devices" to --Analog Devices--

Column 5
Line 5, add --,-- after "circuit"

Column 6
Line 16, change "RiVIS" to --RMS--
Line 30, remove "determining"